US010353879B2

(12) United States Patent
Mielenhausen

(10) Patent No.: US 10,353,879 B2
(45) Date of Patent: Jul. 16, 2019

(54) DATABASE CATALOG WITH METADATA EXTENSIONS

(71) Applicant: SAP SE, Walldorf (DE)

(72) Inventor: Bjoern Mielenhausen, Plankstadt (DE)

(73) Assignee: SAP SE, Walldorf (DE)

( * ) Notice: Subject to any disclaimer, the term of this patent is extended or adjusted under 35 U.S.C. 154(b) by 763 days.

(21) Appl. No.: 14/944,675

(22) Filed: Nov. 18, 2015

(65) Prior Publication Data

US 2017/0139995 A1     May 18, 2017

(51) Int. Cl.
    *G06F 16/21*     (2019.01)
    *G06F 16/22*     (2019.01)

(52) U.S. Cl.
    CPC ............ *G06F 16/22* (2019.01); *G06F 16/211* (2019.01)

(58) Field of Classification Search
CPC ... G06F 17/30312; G06F 16/22; G06F 16/211
See application file for complete search history.

(56) References Cited

U.S. PATENT DOCUMENTS

| | | | |
|---|---|---|---|
| 6,493,720 B1 * | 12/2002 | Chu | G06F 17/30353 |
| 7,546,598 B2 | 6/2009 | Blumenthal et al. | |
| 9,304,747 B1 | 4/2016 | Mielenhausen et al. | |
| 9,946,781 B2 | 4/2018 | Mielenhausen | |
| 10,042,889 B2 | 8/2018 | Mielenhausen | |
| 10,120,885 B2 | 11/2018 | Mielenhausen | |
| 2004/0139061 A1 * | 7/2004 | Colossi | G06F 17/30592 |
| 2004/0225696 A1 * | 11/2004 | Wong | G06F 17/30578 |
| 2006/0184571 A1 * | 8/2006 | Liu | G06F 17/30274 |
| 2010/0095197 A1 * | 4/2010 | Klevenz | G06F 17/2247 715/234 |
| 2012/0030225 A1 * | 2/2012 | Muller | G06F 17/30289 707/760 |
| 2012/0173522 A1 * | 7/2012 | Girsig | G06Q 10/10 707/736 |
| 2012/0173581 A1 | 7/2012 | Hartig et al. | |
| 2012/0284259 A1 * | 11/2012 | Jehuda | G06F 17/30734 707/722 |
| 2012/0303625 A1 * | 11/2012 | Ciodaru | G06F 17/30566 707/740 |
| 2014/0019352 A1 * | 1/2014 | Shrivastava | G06Q 20/3674 705/41 |
| 2014/0358855 A1 | 12/2014 | Mielenhausen | |
| 2015/0113500 A1 * | 4/2015 | Badawy | G06F 8/20 717/105 |
| 2015/0120686 A1 | 4/2015 | Mielenhausen | |
| 2016/0350337 A1 | 12/2016 | Mielenhausen | |
| 2018/0018368 A1 | 1/2018 | Baeuerle et al. | |
| 2018/0096032 A1 | 4/2018 | Mielenhausen et al. | |

\* cited by examiner

*Primary Examiner* — Cam Y T Truong
(74) *Attorney, Agent, or Firm* — Fish & Richardson P.C.

(57) ABSTRACT

A computer-implemented method for managing the differences in the schema of data stored in a database and the schema of data as consumed by a client application. The method involves creating additional metadata related to a property, attribute, or characteristic of a database object stored in the database, storing this additional metadata in a database catalog, and making the additional metadata available for access or retrieval by a query received from the client application for the database object stored in the database.

15 Claims, 7 Drawing Sheets

```
<table> // defines table'//
  <thead> //defines table heading //
    <tr> //defines
    table row//
      <td>Caption for column 1</td> // defines
        ...
      <td>Caption for column N</td>
        </tr>
      </thead>
  <tbody>
<?php
$res = $pdo->query("SELECT * FROM tab WHERE ..."); foreach
($res as $line) {
  echo "<tr>";
  echo "  <td>format($line["Column1"], Num)</td>"
        ...
      "   <td>format($line["ColumnN"], Curr)</td>"; echo
  "<tr/>";
}
?>
    </tbody>
</table>
```

FIG. 2

```
<?php
$res = $pdo->query("SELECT * FROM tab WHERE …");
?>
<table>
  <thead>
      <tr>
<?php
foreach ($res->getMetaData() as $col) { echo
  "<td>{$col->getHeading()}</td>";
}
?>
    </tr>
  </thead>
  <tbody>
<?php
foreach ($res as $line) { echo
  "<tr>";
  foreach ($res->getMetaData() as $col) {
    // printColumn ensure appropriate formatting
    echo "<td>{$col->printColumn(line[$col->getIndex()])}</td>";
  }
  echo "<tr/>";
}
?>
  </tbody>
</table>
```

```
<?php
$res = $pdo->query($_GET['Query']);
?>
<table>
  <thead>
        <tr>
<?php
foreach ($res->getMetaData() as $col) { echo
  "<td>{$col->getHeading()}</td>";
}
?>
        </tr>
  </thead>
  <tbody>
<?php
foreach ($res as $line) { echo
  "<tr>";
  foreach ($res->getMetaData() as $col) {
    echo "<td>{$col->printColumn(line[$col->getIndex()])}</td>";
  }
  echo "<tr/>";
}
?>
  </tbody>
</table>
```

```
CREATE TABLE ORDERS ( ID INT,
  ORDER_DATE@(Heading = 'Date of Order'),
  CUSTOMER_ID INT,  -- FK to table CUSTOMERS
);
```

```
CREATE TABLE ORDERS ( ID INT,
  ORDER_DATE@(Heading = 'Date of Order'),
  CUSTOMER_ID INT,  -- FK to table CUSTOMERS
);

ALTER ORDER.ORDER_DATE@(Heading = 'Date of Order');
```

```
CREATE TABLE ORDERS ( ID INT,
  ORDER_DATE@(Heading = 'Date of Order'),
  CUSTOMER_ID INT,   -- FK to table CUSTOMERS
);

CREATE VIEW VO AS
```

```
CREATE TABLE ORDERS (
  ID@(Heading = 'Id') INT, ORDER_DATE@(Heading =
  'Date of Order'), CUSTOMER_ID INT,   -- FK to
  table CUSTOMERS
);

CREATE VIEW VO AS SELECT ID AS
  IDENT,
  ORDER_DATE@(Heading = 'Order Date') FROM ORDERS;
```

Creating additional metadata related to the properties, attributes, or characteristics of the data objects stored in the database

912
Compiling metadata definitions (e.g., data definition language (DDL) statements) by the database complier

914
Compiling metadata definitions (e.g., data definition language (DDL) statements) to reflect the changes to the database objects in the additional metadata

920
Storing this additional metadata in the database catalog

930
Making the additional metadata (along with the primary metadata) available for access or retrieval by queries (e.g., received from a client application or web connection to the database)

932
Processing query scripts (e.g., received from a client application or over a web connection to the DBMS) coded in SQL or php languages

934
Providing scripts (for accessing or retrieving metadata from the database) that are stable against, or agnostic to, changes in the schema of database objects (e.g. a stored table) stored in the database

FIG. 9

DATABASE CATALOG WITH METADATA EXTENSIONS

BACKGROUND

A "database" refers to a set of related data and the way it is organized. Access to this data is usually provided by a "database management system" (DBMS) consisting of an integrated set of computer software that allows users to interact with one or more databases and provides access to all of the data contained in the database. The DBMS provides various functions that allow entry, storage and retrieval of large quantities of information and provides ways to manage how that information is organized. In common parlance, the term "database" may refer to both the database and the DBMS used to manipulate the database.

A database model is a data model (e.g., relational or XML), which determines the logical structure of a database and determines the manner in which data can be stored, organized, and manipulated. A popular example of a database model is the relational model, which uses a table-based format. In relational databases, a table is a set of data elements (values) using a model of vertical columns (identifiable by name) and horizontal rows, the cell being the unit where a row and column intersect. A table has a specified number of columns, but can have any number of rows. Structured Query Language (SQL) is a special-purpose programming language designed for managing data held in a relational database management system (RDBMS).

Databases and DBMSs can be categorized according to the database models that they support (such as relational or XML), the type of computer they run on (from a server cluster to a mobile phone), and the query languages used to access the database (such as SQL or XQuery). A database dictionary or database catalog of a database instance consists of metadata in which definitions of database objects such as base tables, views (virtual tables), synonyms, value ranges, indexes, users, and user groups are stored. The database catalog may be used, for example, as a reference guide for a query (e.g., SQL query) to locate and access specific database objects (e.g., fields, rows, or columns of a table) in the database instance.

While database objects (e.g., a table), which is stored in a database according to a fixed database schema or format, may be accessed or retrieved by database queries guided by the metadata in the database catalog, the retrieved database objects may be used or displayed in other data schema or formats (other than the database schema or formats), which may be specific to the user applications. Contemporary applications (e.g., web applications) may use data schema or formats that require large numbers of additional metadata (e.g., UI Label, etc.) to define the data schema or formats used by the applications. Database objects retrieved from a database (e.g., by row, column or table keys) may have to be mapped on to or synchronized with the different data schema or formats used by the querying application. Unfortunately, the mapping process, in addition to being tedious, can be error prone.

Consideration is now given to managing the differences in the data schema and formats of the data stored a database and the data schema and formats of the data used in applications.

SUMMARY SECTION

In a general aspect, database system includes a database and a database catalog. The database catalog includes metadata definitions of the one or more database objects stored in the database and additional metadata describing a property, attribute or characteristic of at least one of the stored database objects.

In another aspect, the database system includes a database compiler coupled to a runtime database processor. The database compiler is configured to, in conjunction with the runtime database processor, compile data definition language (DDL) script to create the additional metadata for a database instance at database compile time and to store the additional metadata in the database catalog.

In a further aspect, the database catalog provides data definition language (DDL) functions that independently allow additional metadata to be attached to a database catalog object, alter the additional metadata attached to the database catalog object, or remove the additional metadata attached to the database catalog object.

In yet another aspect, the database catalog includes a view, having one or more database object components. The additional metadata includes view metadata attached to the view based on the additional metadata attached to the one or more database object components of the view.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

FIG. 2 is an illustration of an example script that may be used by a client application to retrieve a table from a database and to print the retrieved table as a web page display element.

FIG. 3 is an illustration of an example script that may be used by a client application to retrieve a table from a database and to print the retrieved table as a web page display element, in the case in which additional metadata in the database catalog includes column headings of the stored table in the database, in accordance with the principles of the present disclosure.

FIG. 4 is an illustration of an example script, which is coded to print any query result as a web page for client application, in accordance with the principles of the present disclosure.

FIG. 5 is an illustration of an example code using a "CREATE" statement for attaching column headings to a column in a table in a database catalog, in accordance with the principles of the present disclosure.

FIG. 6 is an illustration of an example code in which a "CREATE" statement is used for attaching column headings to columns in a table in a database catalog, and in which an "ALTER" statement is used to remove or modify the column heading attached to a column, in accordance with the principles of the present disclosure.

FIG. 7 is an illustration of an example code for creating a pre-defined view, in accordance with the principles of the present disclosure.

FIG. 8 is an illustration of an example code, which may be used to propagate or redefine metadata attached to a component data base object as metadata attached to a view in which the column headings are renamed, in accordance with the principles of the present disclosure.

FIG. 9 is an illustration of an example method for managing the differences in the schema of data stored in a database and the schema of data as used or consumed by a client application, in accordance with the principles of the present disclosure.

DETAILED DESCRIPTION

Figure 1:
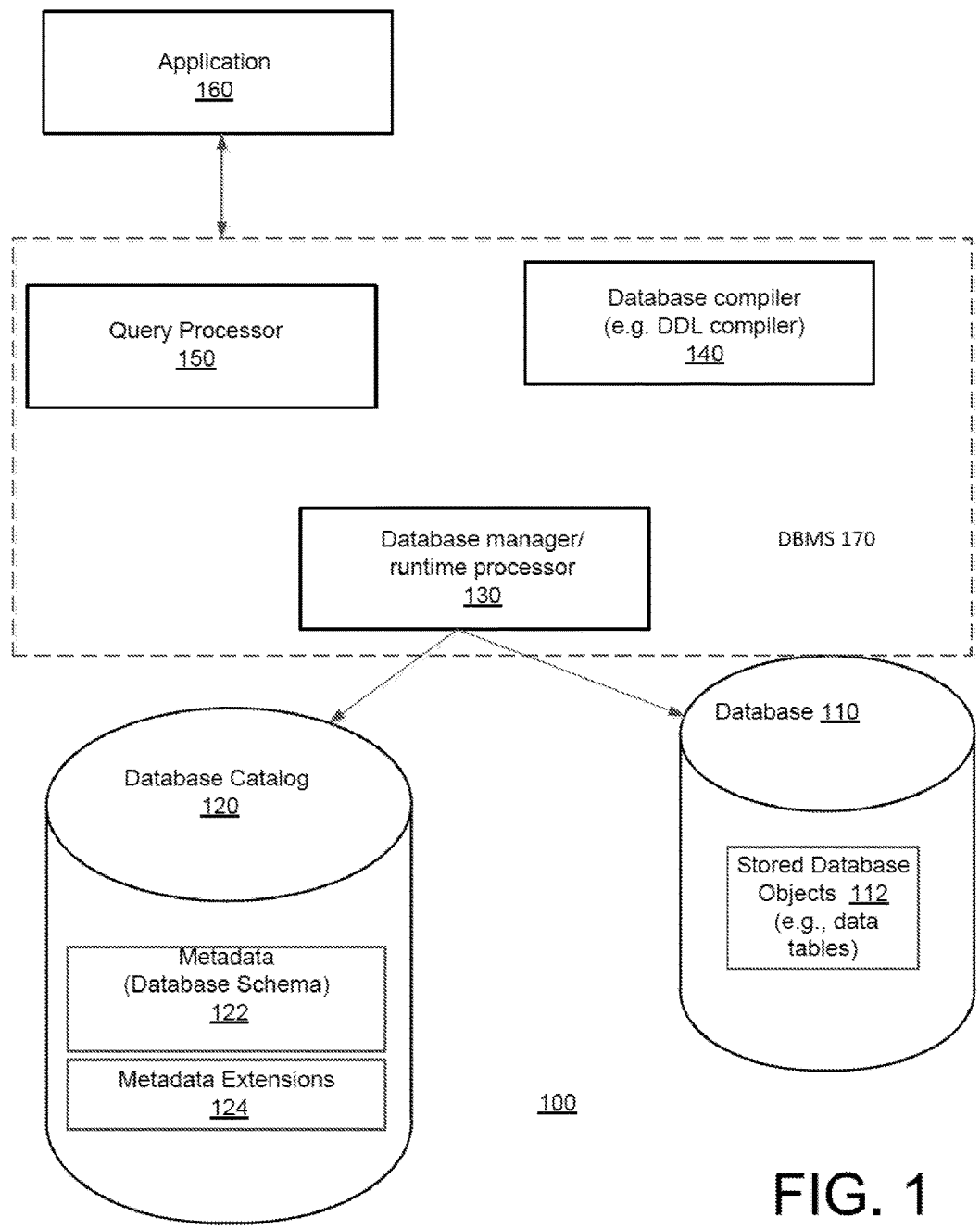
FIG. 1 is a schematic block diagram illustration of an example database system, in accordance with the principles of the present disclosure.

The term "database system" as used herein may refer collectively to a database model, a database management system (DBMS), and a database.

Systems and methods (collectively "solutions") for managing the differences in the schema of data stored in a database (e.g., a SQL database) and the schema of data as used or consumed by a querying application (e.g., an application used for online analytical applications processing (OLAP)) are described herein.

In accordance with the principles of the disclosure herein, a solution for managing the differences in the schema of data stored in a database and the schema of data as used by a querying application involves attaching additional metadata to the "primary" metadata stored in the database catalog. The primary metadata may describe the structure of various database objects or elements such as table, views or columns. The additional metadata may, for example, describe data elements (values) including UI-related column headings, user's input validation or default aggregation for views in online analytical applications processing (OLAP), etc. The additional metadata may be requested (e.g., by a query processor) along with or independently from querying data stored in the database.

FIG. 1 shows an example database system 100 for implementing the foregoing solution, in accordance with the principles of the present disclosure. Database system 100 may include a database (e.g., database 110) and a corresponding database catalog (e.g., database catalog 120) coupled to a database management system (e.g., DBMS 170). DBMS 170 may include a database manager/runtime processor 130, a database complier 140 and a query processor 150. An application 160 (e.g., an online analytical application or other business application) may query database 110 via DBMS 170 to access data stored in database 110.

In example implementations, database 110 may, for example, a SQL relational database in which data (e.g., data files 112), is stored in a table-based format on disks or in semiconductor memory. Database catalog 120, which may be coupled to or appended to database 110, may include metadata 122 identifying the data structure of database 110. Metadata 122, may, for example, identify tables, fields, keys, etc. in the stored data (e.g., data files 112), and include statistics or characteristics (e.g., size of the tables, how stored, etc.) of the stored data.

Database manager/runtime processor 130 may be configured to perform access to database 110 and database catalog 120 at the request of higher level DBMS components (e.g., query processor 150, database complier 140, etc.) and carry out access plans of the higher level DBMS components. Query processor 150 may be configured to process query instructions (received by DBMS 170, for example, from application 160) for correctness (e.g., syntax and references) and permissions, and translate the query instructions into stored data access and manipulation plans for implementation by database manager/runtime processor 130 in database 110.

Database complier 140 (which may be a data definition language (DDL) complier) may be configured, in conjunction with database manager/runtime processor 130, to build and modify the structure of tables and other database objects in database 110 and to record the data definitions in the database catalog 120 (e.g., metadata 122), for example, at a database compile time. Database complier 140 may be configured to process DDL instructions (e.g., "Create Table") (received by DBMS 170, for example, from application 160 or a connection to a web page script) for correctness and permissions and create, for example, a database catalog manipulation plan and make entries or data definitions in the database catalog 120 (e.g., metadata 122) corresponding to the building of, or modifications to, the structure of tables and other database objects in the database 110.

In accordance with the principles of the present disclosure, database system 100 is further configured to include additional metadata (e.g., metadata 124) in database catalog 120. Additional metadata 124 may be based on consideration of the data schema requirements of a client application (e.g., application 160 or a connection to a web page script), which consumes data queried or retrieved from database 110, and may be designed to facilitate the use of data queried or retrieved from database 110 by the client application (e.g., application 160 or a connection to a web page script) with little or no additional processing to map different data structures or schemas. Additional metadata 124 may, for example, include: UI-related column headings, user's input validations, and default aggregation for views in online analytical applications processing (OLAP).

In an example scenario, a client application (e.g., application 160) may query and fetch data from database 110, using for example, SQL queries. The client application may create a create an html for a user interface (UI) display of the data (e.g. a table) using either static code, templates etc., or investigate the queries result-set data by using a reflection API in order to build the UI, and process the queries result-set data row-by-row to display the data in the UI. The client application may, for example, use Hypertext Preprocessor (php) scripting language for processing and displaying the data (e.g., a table) on a web page. In other example implementations, the client application may, for example, use Open Data Protocol (OData) or other proprietary binary protocols for processing and displaying the data on the web page.

In the example scenario, a table stored in database 110 (with rows and columns as defined in metadata 122/database catalog 120) may, for example, include different columns of data (including, for example, a column representing number values, a column representing currency types, and a column representing transaction dates, etc.). The values of the data in the columns in the table may be stored in database 110 in the specific formats (e.g., locale-sensitive number format, currency type, locale-sensitive date format, etc.). Client application 160 may be programmed to display the retrieved table using the same the specific formats as used or identified in database 110 or may be programmed to display the retrieved table in a different format. For example, locale-sensitive date format identified in metadata 122 may be the European style: date-month-year, while client application may use or display the US style locale-sensitive date format: month-date-year.

FIG. 2 shows an example script 200 that may be used by a client application (e.g., application 160) to retrieve a table from database 110 and to print the retrieved table as a web page display element. The table may, for example, include different columns of data (including, for example, a column representing number values, and a column representing currency types). The columns in the table may be stored in database 110 in specific formats (e.g., locale-sensitive number format, currency type, etc.).

In example script 200, php code used for generating the web page display of the table is embedded in HTML code. For convenience in visual identification, as shown in FIG. 2, the HTML code is highlighted in bold font and the php code is shown in regular font. Further, it is noted that with respect to the HTML code, the instruction <table> defines a table; instruction <thead> groups the header content in a table; instruction <tbody> groups the body content in a table; instruction <td> defines a cell in a table; and instruction <tr> defines a row in a table. The php code in script 200 includes a query statement (e.g. a SQL query instruction: "query ("SELECT * FROM tab WHERE . . . ") to retrieve table column headings and data from a column "tab". The query statement is executed in a loop row-by-row (e.g., for each "$line") to format column headings (e.g., "column 1") and data (e.g., "number") of the displayed table.

It will be noted that while example script 200 may represent an intuitive approach for displaying the table, example script 200 suffers from several flaws which limit use of the script for displaying the table in different or changing client application and database scenarios. First, in example script 200, text representing the column headings (e.g., "<td> caption for column 1<td>') is buried in the HTML code and there is no link between the column headings and the columns residing in database catalog 120/metadata 122. Second, example script 200 may not be useful in situations where the underlying table stored in database 110 is subject to change (e.g., when columns are deleted or added to the stored table, or when a column data type is changed). The php query statement using a wild card asterisk "*" (i.e. "query ("SELECT * FROM tab WHERE . . . ")") in example script 200 is stable and can be used even when columns are deleted or added to the stored table, or when a column data type is changed. However, the php loop statement (i.e. "for each ($res as $line . . . ) requires modification to change the formatting instructions for columns (e.g., "<td>format ("Column1"), Num)<td>") when, for example, columns are deleted or added to the stored table.

In accordance with the principles of the present disclosure, database catalog 120 may include additional metadata 124, which includes additional descriptions of the values or attributes of the database objects stored in database 110. The additional metadata 124 may be included in database catalog 120 using DDL statements compiled by database complier 140 (FIG. 1). Additional metadata 124 (which is in addition to metadata 122 that includes definitions of the database objects) may, for example, include information related to, or derived from, the properties, attributes or characteristics of database objects stored in database 110. Additional metadata 124 may, for example, include the syntax or text of column headings of the stored table in database 110. When columns are deleted or added to the stored table, or when a column data type is changed, the changes can be reflected in additional metadata 124.

FIG. 3 shows example script 300 that may be used by a client application (e.g., application 160) to retrieve a table from database 110 and to print the retrieved table as a web page display element, in the case in which additional metadata 124 in database catalog 120 includes column headings of the stored table in database 110. Example script 300 is coded to print the table on the web page cell-by-cell.

In contrast to script 200 in which column headings are explicitly recited (or "hard-wired"), example script 300 uses a php function (e.g., "getMetaData") to read additional metadata 124 and gets the column headings from the metadata (e.g., "for each ($res->getMetaData( ) as $col) {echo "<td>{$col->getHeading( )}</td>"). It will be noted that in contrast to script 200, example script 300 can be used without modification by client application 160 to display the stored table as a web page, even in situations where the underlying table stored in database 110 is subject to change (e.g., when columns are deleted or added to the stored table, or when a column data type is changed). Example script 300 may be stable against, or agnostic to, changes in the structure of the underlying stored table. It may not be necessary to modify script 300 as any changes in the structure of the underlying stored table are reflected in, and queried by script 300 from, additional metadata 124.

In an example implementation, script 300 may be rewritten to print any queried database object. FIG. 4 shows, for example, such an example script 400 (based on script 300), which is coded to print any "Query" result as a web page for client application 160. Example script 400, like script 300, may use a "getMetaData" function to access metadata information related to the queried database object in database catalog 120.

Scripts (e.g., script 300, script 400) for retrieving database objects (e.g., tables, columns, etc.) for consumption by client application 160 (e.g., for display in a UI) may be agnostic to database schema changes based on the descriptive information included in additional metadata 124. These scripts may be reusable without modification, for example, when client application 160 interfaces with different instances of database 110 or other databases. For each instance of database 110, specific information (e.g., column headings) related to the database objects (which are defined, for example, in metadata 122/database catalog 120) in the database may be compiled into metadata 124 using DDL statements when compiling the database instance. In example implementations, the metadata may be stored in database catalog 120 as a traditional table or may be encoded as a set of key value pairs.

Database catalog 120 may provide the DDL statements for attaching certain information to catalog objects (e.g., tables or columns). FIG. 5 shows an example code 500 using a "CREATE" statement for attaching column headings (e.g., "(heading—'date of order')) to a column "ORDER_DATE" in table "ORDERS" in database catalog 120.

In some example implementations, the life cycles of primary information (metadata 122) and the additional metadata (metadata 124) in database catalog 120 may be decoupled from each other. For example, an "ALTER" statement, which can be executed independently of the "CREATE" statement, may be used to change or remove the additional metadata (metadata 124) in database catalog 120. FIG. 6 shows an example code 600 in which a "CREATE" statement is used for attaching column headings (e.g., "(heading—'date of order')) to a table "ORDERS" in database catalog 120, and in which an "ALTER" statement is used to remove or modify the column heading 'date of order' attached to column "ORDER_DATE".

In some example implementations, client application 160 may query DBMS 170 for a pre-defined view of database 110. The pre-defined view may, for example, represent a subset of the data contained in a table, join and simplify multiple tables into a single virtual table, act as aggregated tables, or represent other abstractions of database 110. A definition of the predefined view may be included in database catalog 120.

The pre-defined view may, for example, be a result set of a stored query on the data, which client application 160 can query just as it would in a persistent database collection object. This pre-established query command may be kept in database catalog 120. The pre-defined view may not form a part of the physical schema of database 110, but may be a result set that is computed or collated as a virtual table dynamically from data in the database when access to that view is requested. Changes applied to the data in a component or underlying table may be reflected in the result set data shown in subsequent invocations of the view.

FIG. 7 shows example code 700 for creating an example pre-defined view "VO" for the table "ORDERS" (of FIGS. 5 and 6 discussed above). View "VO" as defined by code 700, for example, includes the data contained in column ORDER_DATE under the heading "date of order" as a component of the view.

In accordance with the principles of the disclosure herein, the solutions for managing the differences in the schema of data stored in a database and the schema of data as used by a querying application may include propagating or aggregating the additional metadata attached to individual components (i.e. database objects) of a pre-defined view as metadata attached to the predefined view object itself.

For example, with reference to FIG. 7, the metadata attached to column Order_Date may be propagated forward and attached to view VO. Query access to view VO may include access to same metadata attached to view component—column Order_Date.

A pre-defined view may modify, join, aggregate or otherwise abstract individual components (i.e. database objects) of the view. In such instances also, the additional metadata attached to individual components (i.e. database objects) in the pre-defined view may be propagated or aggregated as metadata attached to the predefined view object itself in the database catalog. As an example, a pre-defined view may rename a column of a component table of the view. For example, with reference to FIG. 7, Table "ORDERS", which is a component of view VO, has column headings "Date of Order" (e.g., month-day-year). However, in view VO, the column headings may be renamed as "Order Date" (e.g., day-month-year"). FIG. 8 shows example code 800, which may be used to propagate or redefine metadata (e.g., "Date of Order") attached to a component data base object (e.g., Table "ORDERS") to a view (e.g., VO) in which the column headings are renamed as "Order Date."

With renewed reference to FIG. 1, it may be again noted that the metadata (e.g., metadata 122 and metadata 124), which is generated by compiling DDL statements (e.g., codes 400-800), is stored in database catalog 120 that is attached or appended to database 110. Like the data in database 110 which has to be queried for retrieval or access, all required metadata from database catalog 140 has to be queried for retrieval or access. DBMS 170 (including Database complier 140 and Query processor 150) may be configured so that in response to a query (e.g., received from application 160 or a web page connection) the metadata is computed and retrieved from database catalog 140 together with the queried data from database 110 in one round-trip.

Examples of queries to retrieve or access metadata are described herein with reference to the metadata (e.g., column headings) defined by compiling code 800 (FIG. 8) for TABLE_ORDERS and VO. An example metadata query may be:

SELECT IDENT@(Heading=?), ORDER_DATE@(HEADING=?) FROM VO WHERE . . .

The foregoing metadata query is coded to request "column headings" for both TABLE_ORDERS and VO from database catalog 140. In general, a convenience pattern may be defined to request metadata more flexibly. For example, a query SELECT *@(Heading=?) FROM VO WHERE . . . , may be used to retrieve the heading information for all columns, while a query

SELECT *@(*=?) FROM VO WHERE . . . , may be used to retrieve all metadata (including the heading information) for all columns.

To investigate the signature of a particular view of database 110 including all annotations, a "DESCRIBE" statement may be used, for example, as:

DESCRIBE SELECT *@(*=?) FROM VO;

The DESCRIBE statement may also be used to request information of any ad-hoc query, for example, as:

DESCRIBE SELECT Ident@(Heading=?) FROM VO WHERE . . .

FIG. 9 shows an example method 900 for managing the differences in the schema of data stored in a database and the schema of data as used or consumed by a client application, in accordance with the principles of the disclosure herein.

The database (e.g., a SQL relational database) may be part of database management system (DMBS), which may include a query processor and a database compiler (e.g., a DDL compiler). The database may include or be coupled to a database catalog, which includes "primary metadata" definitions of database objects (e.g., base tables, views (virtual tables), synonyms, value ranges, indexes, users, and user groups, etc., where and how stored, etc.) that are stored in the database. The primary metadata definitions of database objects may relate to database structure (e.g., where and how the database objects are stored).

Method 900 may, for example, be implemented in conjunction with database system 100 (described in the foregoing with reference to FIG. 1) or any other database systems Method 900 involves creating additional metadata related to the properties, attributes, or characteristics of the database objects stored in the database (910), storing this additional metadata in the database catalog (920), and making the additional metadata (along with the primary metadata) available for access or retrieval by queries (e.g., received from a client application or web connection to the database) (930). The additional metadata may, for example, include column headings of a table stored in the database, user's input validation or default aggregation for views in online analytical applications processing (OLAP), etc.

In method 900, creating additional metadata related to the properties, attributes, or characteristics of the database objects stored in the database 910, may involve compiling metadata definitions (e.g., data definition language (DDL) statements) by the database complier (912). When the database objects are changed (e.g., when columns are deleted or added to a stored table, or when a column data type is changed) method 900 may include compiling metadata definitions (e.g., data definition language (DDL) statements) to reflect the changes to the database objects as changes in the additional metadata (914).

In method 900, making the additional metadata available for access or retrieval by queries 930 may include processing scripts (e.g., received from a client application or over a web connection to the DBMS) coded in SQL or php languages (932). An example script may use a php function (e.g., "getMetaData") to read the additional metadata. An example script may be coded to retrieve a table from the database and to print the retrieved table as a web page display element, for example, in the case in which the additional metadata includes column headings of the table stored in the database.

Further, making the additional metadata available for access or retrieval by queries 930 may include providing scripts (for accessing or retrieving metadata from the database) that are stable against, or agnostic to, changes in the schema of database objects (e.g. a table) stored in the database (934).

In method 900, storing the additional metadata in the database catalog 920 may include storing the metadata in database catalog as a table and/or a set of key value pairs.

Storing the additional metadata in the database catalog 920 may also include changing or removing the additional metadata (using, for example, an "ALTER" statement) in response to changes in the underlying database objects stored in the database.

In some example implementations of method 900, creating additional metadata related to the properties, attributes, or characteristics of the database objects stored in the database 910 may include creating additional metadata for a pre-defined view of the database. The pre-defined view of the database may include one or more components (i.e. database objects (e.g., columns, tables, etc.) stored in the database). Creating additional metadata for a pre-defined view of the database may include propagating or aggregating metadata associated with the database object components as metadata for the pre-defined view.

The various systems and techniques described herein may be implemented in digital electronic circuitry, or in computer hardware, firmware, or in combinations of them. The various techniques may implemented via a computer program product, i.e., a computer program with instructions tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, logic circuitry or special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A database system comprising:
a memory;
a database storing one or more database objects;
a database catalog coupled to the database and storing metadata definitions of the one or more stored database objects, wherein the one or more stored database objects include a table and additional metadata describing a property, attribute or characteristic of at least one of the stored database objects; and
at least one processor configured to:
create, based on data definition language (DDL) script, the additional metadata for a database instance at database compile time, wherein the additional metadata is used to manage differences in schema of the at least one of the stored database objects stored in the database and schema of the at least one of the stored database objects as consumed by a client application;
store the additional metadata as a set of key value pairs in the database catalog in the memory, wherein the database catalog includes a view, the view having one or more database object components, and wherein the additional metadata includes view metadata attached to the view, the view metadata is based on the additional metadata attached to the one or more database object components of the view;
make the additional metadata available for access or retrieval by queries via the client application, wherein the making includes providing a script for accessing or retrieving metadata from the database, the script is stable against or agnostic to changes in the schema of the stored database objects stored in the database;

compile the metadata definitions to reflect the changes to the stored database objects as changes in the additional metadata;

receive a query received from the client application for the at least one of the stored database objects stored in the database;

in response to receiving the query for the at least one of the stored database objects, retrieve the additional metadata from the database catalog and the at least one of the stored database objects from the database, wherein the additional metadata is retrieved together with queried data from the database in one round trip; and update, by DDL functions that independently allow additional metadata to be attached to a database catalog object, the retrieved additional metadata attached to the database catalog object.

2. The database system of claim 1, wherein the additional metadata includes column headings of the table.

3. The database system of claim 1, further comprising, a database compiler coupled to a runtime database processor, the database compiler configured to, in conjunction with the runtime database processor, compile data definition language (DDL) script to create the additional metadata for a database instance at database compile time and to store the additional metadata in the database catalog.

4. The database system of claim 1 further configured to receive and process script coded in Hypertext Preprocessor (php) language to access and retrieve the additional metadata.

5. The database system of claim 1, wherein the database catalog provides data definition language (DDL) functions that independently allow additional metadata to be attached to a database catalog object, alter the additional metadata attached to the database catalog object, or remove the additional metadata attached to the database catalog object.

6. The database system of claim 1, wherein the view metadata attached to the view includes a redefinition of the additional metadata attached to the one or more database object components of the view.

7. A computer-implemented method, comprising:

storing, by a computer, in a database one or more database objects;

storing, by the computer, metadata definitions of the one or more stored database objects, wherein the one or more stored database objects include a table;

creating, based on data definition language (DDL) script by a computer, an additional metadata for a database instance at database compile time, wherein the additional metadata is related to a property, attribute, or characteristic of a database object stored in a database, and wherein the additional metadata is used to manage differences in schema of the database object stored in the database and schema of the database object as consumed by a client application;

storing the additional metadata as a set of key value pairs in a database catalog in a memory coupled to the database, wherein the database catalog includes a view, the view having one or more database object components, and the additional metadata includes view metadata attached to the view, the view metadata is based on the additional metadata attached to the one or more database object components of the view;

making, by the computer, the additional metadata available for access or retrieval by queries via the client application, wherein the making includes providing a script for accessing or retrieving metadata from the database, the script is stable against or agnostic to changes in the schema of database objects stored in the database;

compiling, by the computer, the metadata definitions to reflect the changes to the database objects as changes in the additional metadata;

receiving, by the computer, a query received from the client application for the database object stored in the database;

in response to receiving the query for the database object, retrieving by the computer, the additional metadata from the database catalog and the database object from the database, wherein the additional metadata is retrieved together with queried data from the database in one round trip; and updating, by data definition language (DDL) functions of the computer that independently allow additional metadata to be attached to a database catalog object, the retrieved additional metadata attached to the database catalog object.

8. The method of claim 7, wherein creating additional metadata related to the property, attribute, or characteristic of the database object stored in the database includes compiling data definition language (DDL) statements when the database object is changed to reflect the change to the database object in the additional metadata.

9. The method of claim 7, wherein making the additional metadata available for access or retrieval by queries includes processing a script received from a client application or over a web connection, the script including Hypertext Preprocessor (php) language code.

10. The method of claim 9, wherein the script uses a php function to read the additional metadata.

11. The method of claim 9, wherein the additional metadata includes column headings of a table stored in the database, and wherein the script is coded to retrieve a table from the database and to print the retrieved table as a web page display element using the column headings in the additional metadata.

12. The method of claim 7, wherein storing the additional metadata in the database catalog includes storing the additional metadata as a table.

13. The method of claim 7, wherein storing the additional metadata in the database catalog includes changing or removing the additional metadata in response to changes in the database objects stored in the database.

14. The method of claim 7, wherein creating additional metadata related to the property, attribute, or characteristic of the database object stored in the database includes creating additional metadata for a pre-defined view of the database, the pre-defined view of the database including one or more database object components stored in the database.

15. The method of claim 14, wherein creating additional metadata for the pre-defined view of the database includes propagating or aggregating metadata associated with the database object components as metadata for the pre-defined view.

* * * * *